US007533828B2

(12) United States Patent
Ong

(10) Patent No.: US 7,533,828 B2
(45) Date of Patent: *May 19, 2009

(54) ELECTRONIC CREDIT CARD—ECC

(76) Inventor: Yong Kin (Michael) Ong, 5 Sellenger Ct., City Beach, Western Australia (AU) 6015

(*) Notice: Subject to any disclaimer, the term of this patent is extended or adjusted under 35 U.S.C. 154(b) by 0 days.

This patent is subject to a terminal disclaimer.

(21) Appl. No.: 11/897,089

(22) Filed: Aug. 28, 2007

(65) Prior Publication Data

US 2007/0295806 A1    Dec. 27, 2007

Related U.S. Application Data

(63) Continuation of application No. 10/203,870, filed on Oct. 15, 2002, now Pat. No. 7,278,581.

(30) Foreign Application Priority Data

Feb. 16, 2001    (AU)    ............... PCT/AU01/00170

(51) Int. Cl.
G06K 19/06    (2006.01)
(52) U.S. Cl. .............. 235/492; 235/380; 235/487; 235/379; 902/25; 902/26; 705/39; 705/41; 705/64; 382/117; 382/124; 340/5.4; 340/5.41; 340/5.42
(58) Field of Classification Search ............ 235/379, 235/380, 487, 492; 902/25, 26; 705/39, 705/41, 64; 340/5.4, 5.41, 5.42; 382/117, 382/124
See application file for complete search history.

(56) References Cited

U.S. PATENT DOCUMENTS 4,277,837 A    7/1981  Stuckert ............... 364/900
(Continued)

FOREIGN PATENT DOCUMENTS

DE    19755568    6/1999
(Continued)

OTHER PUBLICATIONS

Supplementary European Search Report in reference to Application No. EP 01 90 5512 issued on Apr. 6, 2004 (1 Page).
(Continued)

*Primary Examiner*—Michael G Lee
*Assistant Examiner*—Kristy A Haupt
(74) *Attorney, Agent, or Firm*—Ballard Spahr Andrews & Ingersoll, LLP

(57)    ABSTRACT

Electronic Credit Card (ECC) is an electronic device that enables transmission/reception of data and/or digital information to/from a host computer via a Terminal Station (TS). TS includes Teller Machines in supermarkets/shopping complex, Automatic Teller Machines (ATM), EFTPOS devices and proprietary transceiver devices developed by Creative On-Line Technologies Limited for PC interface. It provides latest financial information including balances on its display unit. Keypads (1) enable PIN (personal identification number) entries so that an ECC is operational. Information Display Unit (2) including an LCD (liquid crystal display) screen or other display screens provides visual information. ENTER key (3) confirms a transaction. It is also used to activate an ECC when a PIN is keyed. Audio Transducer (4) confirms entries made on keypads (1). Audio Transducer is also used to activate a financial transaction via a telephone. Data transmission/reception is via Infra red (5), Magnetic (6) and Radio Frequency (7) devices.

25 Claims, 6 Drawing Sheets

U.S. PATENT DOCUMENTS

| | | | | |
|---|---|---|---|---|
| 4,453,074 | A | * | 6/1984 | Weinstein .................... 235/380 |
| 4,614,861 | A | * | 9/1986 | Pavlov et al. ................ 235/380 |
| 4,625,276 | A | | 11/1986 | Benton et al. ............... 364/408 |
| 4,697,072 | A | * | 9/1987 | Kawana ...................... 235/380 |
| 4,701,601 | A | * | 10/1987 | Francini et al. ............. 235/492 |
| 4,755,940 | A | | 7/1988 | Brachtl et al. ............... 364/408 |
| 4,766,293 | A | * | 8/1988 | Boston ........................ 235/380 |
| 5,097,115 | A | * | 3/1992 | Ogasawara et al. ......... 235/380 |
| 5,130,519 | A | * | 7/1992 | Bush et al. .................. 235/380 |
| 5,157,726 | A | | 10/1992 | Merkle et al. ................ 380/23 |
| 5,180,902 | A | * | 1/1993 | Schick et al. ............... 235/380 |
| 5,225,667 | A | | 7/1993 | Furuta et al. ................ 235/492 |
| 5,428,684 | A | | 6/1995 | Akiyama et al. .............. 380/25 |
| 5,539,825 | A | | 7/1996 | Akiyama et al. .............. 380/24 |
| 5,590,038 | A | * | 12/1996 | Pitroda ........................ 705/41 |
| 5,623,552 | A | * | 4/1997 | Lane .......................... 382/124 |
| 5,737,423 | A | * | 4/1998 | Manduley .................... 705/67 |
| 5,884,271 | A | | 3/1999 | Pitroda ......................... 705/1 |
| 5,907,142 | A | * | 5/1999 | Kelsey ........................ 235/380 |
| 5,955,961 | A | * | 9/1999 | Wallerstein ................. 340/5.4 |
| 6,032,857 | A | | 3/2000 | Kitagawa et al. ............ 235/379 |
| 6,098,055 | A | | 8/2000 | Watanabe .................... 705/73 |
| 6,142,369 | A | * | 11/2000 | Jonstromer ................. 235/380 |
| 6,188,309 | B1 | * | 2/2001 | Levine ........................ 340/5.4 |
| 6,257,486 | B1 | * | 7/2001 | Teicher et al. ............... 235/380 |
| 6,510,983 | B2 | * | 1/2003 | Horowitz et al. ............ 235/380 |
| 6,607,127 | B2 | * | 8/2003 | Wong .......................... 235/492 |
| 7,293,717 | B1 | * | 11/2007 | Pathmasuntharan et al. . 235/492 |
| 2001/0034717 | A1 | * | 10/2001 | Whitworth ................... 705/64 |

FOREIGN PATENT DOCUMENTS

| | | |
|---|---|---|
| EP | 0097110 | 12/1983 |
| EP | 0590224 | 4/1994 |
| EP | 0793186 | 9/1997 |
| EP | 0805424 | 11/1997 |
| FR | 2581776 | 11/1986 |
| GB | 1369537 | 10/1974 |
| GB | 2204971 | 11/1988 |
| GB | 2256170 | 12/1992 |
| GB | 2310069 | 8/1997 |
| GB | 2338381 | 12/1999 |
| GB | 2346239 | 8/2000 |
| JP | 60-209871 A * | 10/1985 |
| JP | 9044619 | 2/1997 |
| JP | 11167553 | 6/1999 |
| RU | 2060540 | 5/1996 |
| WO | WO 94/11849 | 5/1994 |
| WO | WO 96/05576 | 2/1996 |
| WO | WO 97/04609 | 2/1997 |
| WO | WO 97/15032 | 4/1997 |
| WO | WO 98/09227 | 3/1998 |
| WO | WO 99/31621 | 6/1999 |
| WO | WO 00/45247 | 8/2000 |
| WO | WO 00/46710 | 8/2000 |

OTHER PUBLICATIONS

International Search Report issued by the Australian Patent Office in reference to Application No. PCT/AU01/00170 issued on Jun. 1, 2001 (4 Pages).

International Search Report issued by the Swedish Patent Office in reference to Application No. PCT/SE 96/00950 issued on Oct. 23, 1996 (2 Pages).

International Search Report issued by the European Patent Office in reference to Application No. PCT/EP 95/05015 issued on Jul. 26, 1996 (3 Pages).

* cited by examiner

Figure 1: A drawing of ECC physical form covering SAC with PIN control using a combination of infra-red, radio frequency and magnetic induction telecommunication devices. Drawing is not to scale.
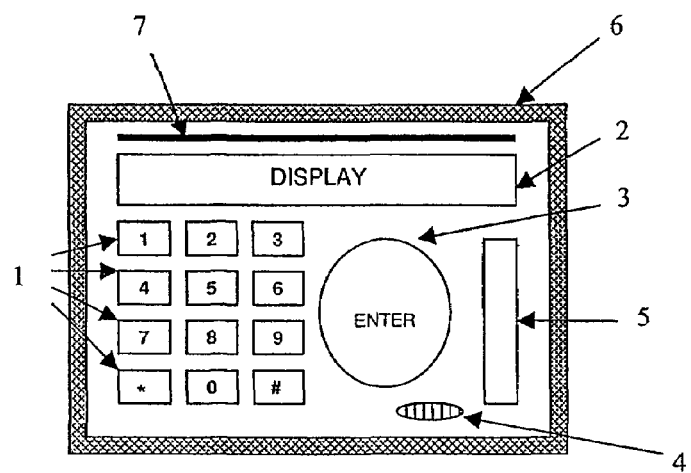

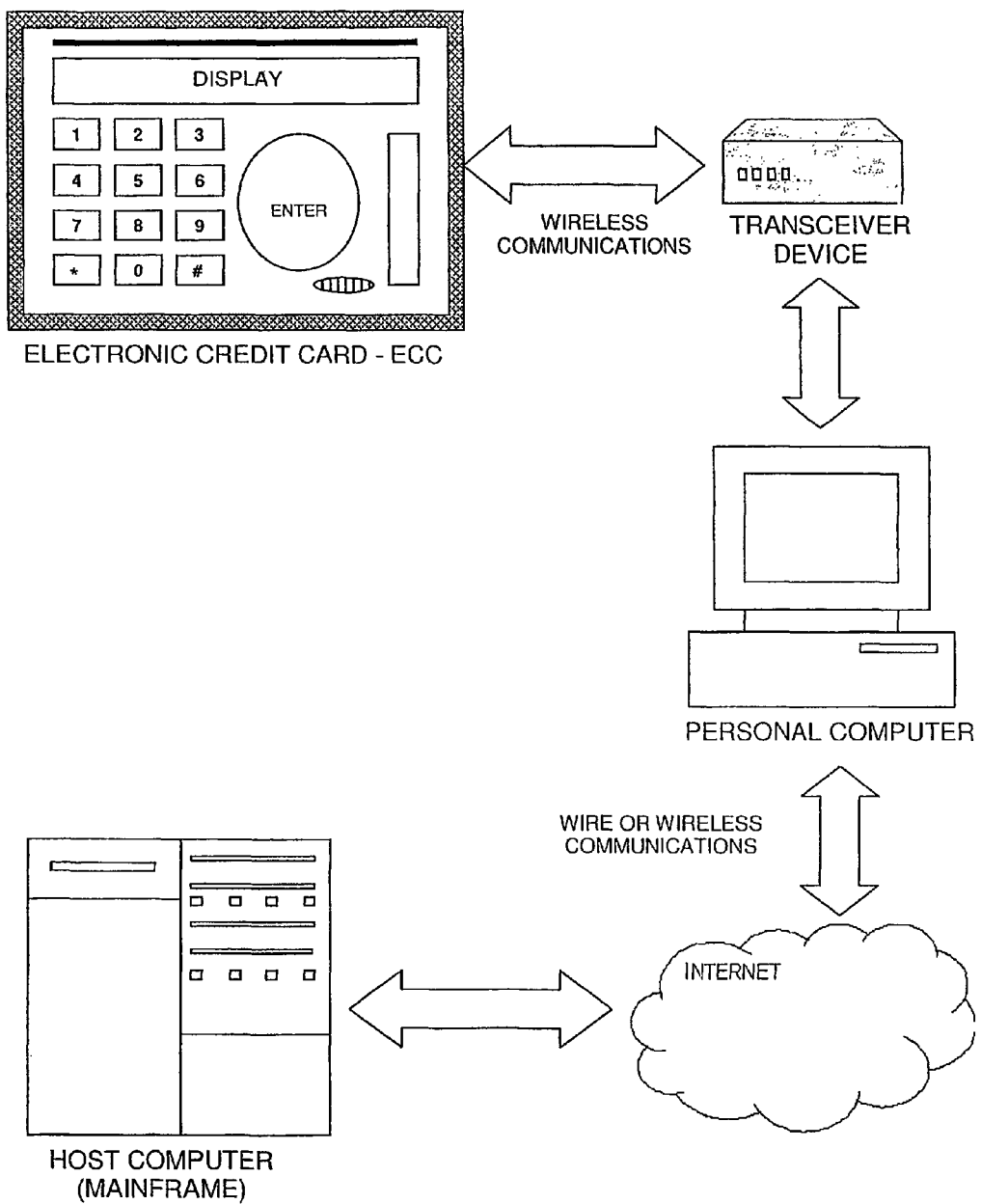
Figure 2: A drawing of ECC communications link to PC and Mainframe Computer. Drawing is not to scale.

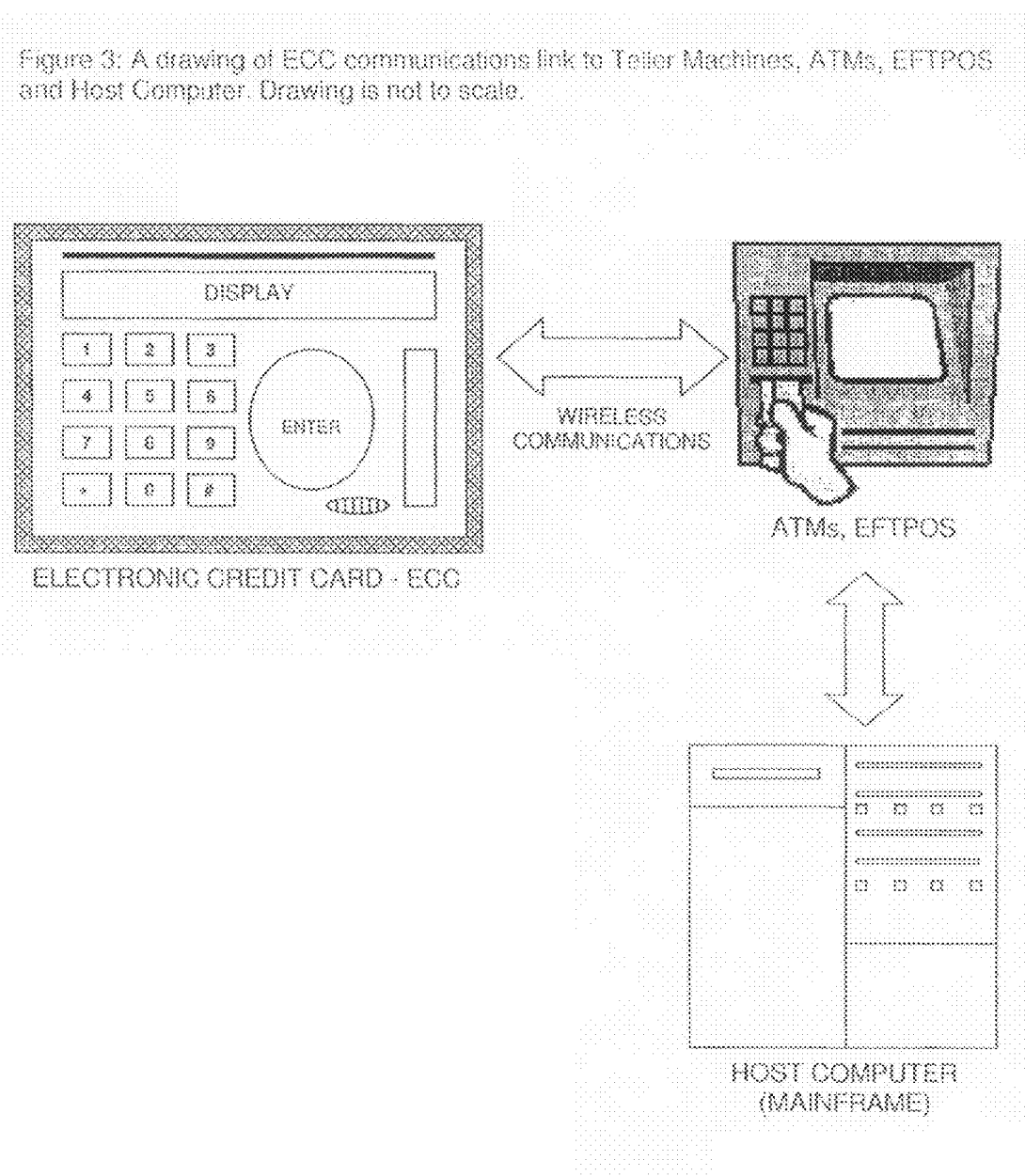

A view of ECC physical form is shown at Figure 4 to 12:

Figure 4: A drawing of ECC physical form covering SAC with PIN control using infrared telecommunication device. Drawing is not to scale.

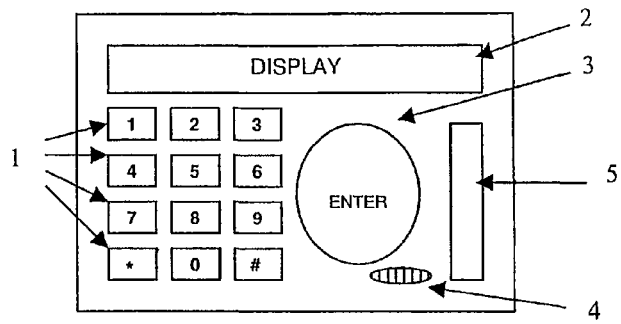

Figure 5: A drawing of ECC physical form covering SAC with PIN control using radio frequency telecommunication device. Drawing is not to scale

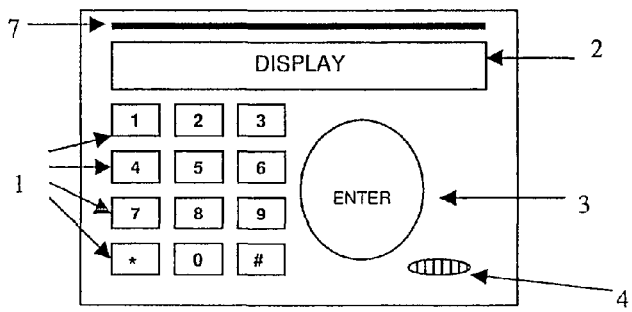

Figure 6: A drawing of ECC physical form covering SAC with PIN control using magnetic induction telecommunication device. Drawing is not to scale.

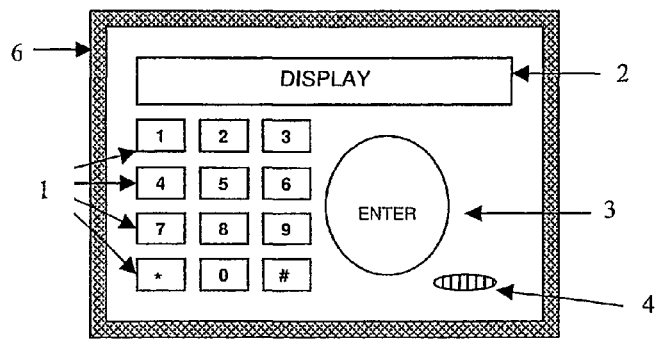

Figure 7: A drawing of ECC physical form covering SAC with PIN control using wire contact telecommunication device. Drawing is not to scale.

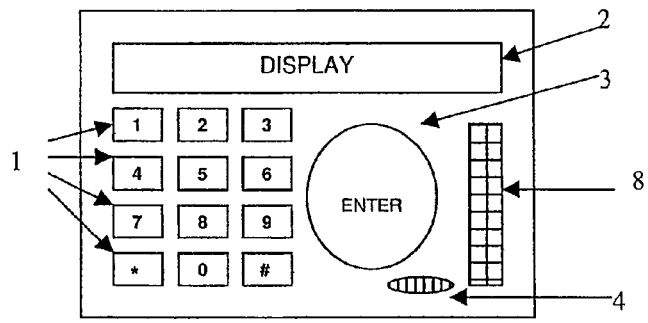

Figure 8: A front view drawing of ECC physical form covering SAC with PIN control using magnetic strip telecommunication device. Drawing is not to scale.

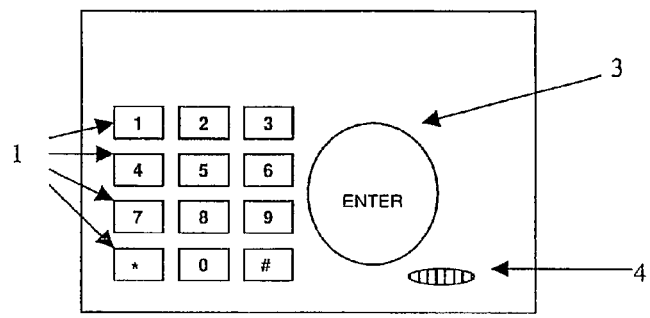

Figure 9: A rear front view drawing of ECC physical form covering SAC with PIN control using magnetic strip telecommunication device. Drawing is not to scale.

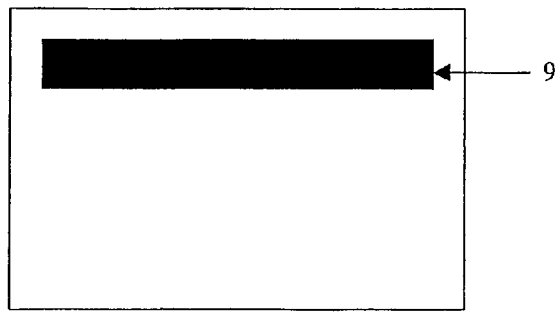

Figure 10: A drawing of ECC physical form covering SAC with PIN control using a combination of infra-red, radio frequency and magnetic induction telecommunication devices. Drawing is not to scale.

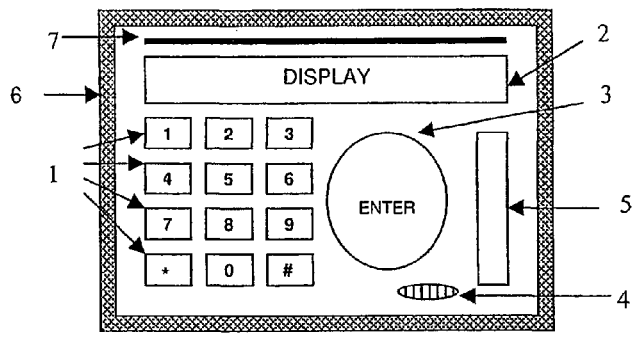

Figure 11: A drawing of ECC physical form covering SAC with finger print scanner pad with a combination of infra-red, radio frequency and magnetic induction telecommunication devices. Drawing is not to scale.

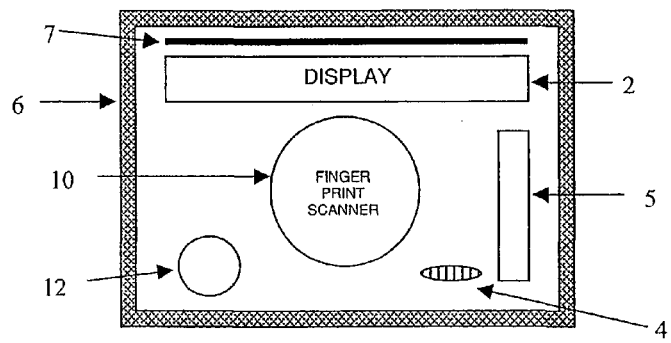

Figure 12: A drawing of ECC physical form covering SAC with eyeball retina scanner pad with a combination of infra-red, radio frequency and magnetic induction telecommunication devices. Drawing is not to scale.

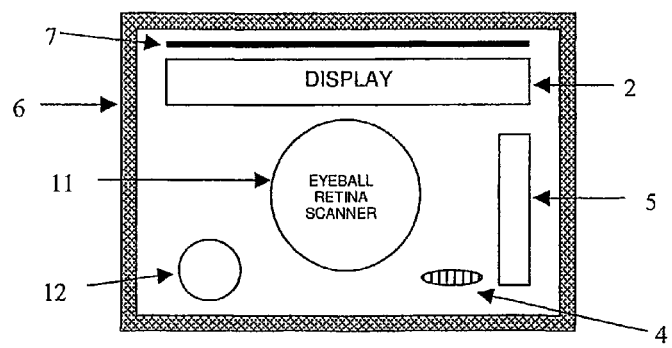

ELECTRONIC CREDIT CARD—ECC

CROSS REFERENCE TO RELATED APPLICATION

This application is a continuation of U.S. Utility application Ser. No. 10/203,870, flied Oct. 15, 2002, which claims priority to international application PCT/AU01/00170, filed Feb. 16, 2001, which claims priority to Australian patent application no. PQ5644 filed Feb. 16, 2000, now U.S. Pat. No. 7,278,581. The aforementioned application(s) are hereby incorporated herein by reference in their entirety.

FIELD OF THE INVENTION

The present invention relates to an electronic credit card providing secure controlled and reliable transaction of funds.

BACKGROUND OF THE INVENTION

The present credit card environment and systems have the following shortfalls:

- When a credit card is reported lost or stolen by a holder he or she has to contact the company or organisation that issued the card to cancel the card in order to prevent illegal transactions. Cancellation may not occur immediately if the holder is unaware that his or her card is missing.
- The present security measures undertaken by credit card companies and/or organisations through the use of "smart card" technology are inadequate to prevent fraud. Similarly the use of holographic images on credit cards does not eliminate fraud either.
- Use of a signature as a validation control may be overlooked and can be forged.
- The technology behind current credit cards is outdated and not suitable for a secure transaction via the Internet.
- It does not prevent hackers who penetrate "secure websites" to make use of credit card details for fraud.
- Giving a merchant credit card details is like giving him or her a "signed blank cheque". Credit companies or organisations are not efficient when dealing with insincere merchants.
- The customer must rely on trusting the merchant not to misuse the credit card details.

The present invention seeks to provide an electronic credit card that attempts to overcome the shortfalls of the present credit card system.

SUMMARY OF THE PRESENT INVENTION

In accordance with the present invention there is provided an electronic credit card comprising at least:

a user of verification means for verifying the identity of a user;

a means for generating a unique authorisation code when the user's identity is verified;

a storage means for storing the user's account details for use in an electronic funds transfer transaction; and a communication means for communicating with a transaction station to provide the transaction station with account details of the user and the authorisation code to facilitate an electronic fund transfer transaction.

Preferably the electronic credit card includes a timer means for determining a period of time after which the verification of the user's identity ends.

Preferably the electronic credit card includes a disablement means for disabling use of the electronic credit card if a predetermined number of attempts verify the identity of the user fail. Preferably the disablement means is activatable remotely by an issuer of the electronic credit card or other authority.

Preferably, in one embodiment, the unique authorisation code is generated in sychronisation with the transaction station.

Preferably the storage means is arranged to store a financial limit for transactions that the electronic credit card may be used for. Preferably the financial limit is provided to the transaction station by the communication means. Alternatively the electronic credit card including a processor means for keeping track of the use of the electronic credit card and will not generate or provide the authorisation code if the financial limit is exceeded. Alternatively the financial limit may be retrieved via the transaction station from a financial institution.

Preferably the storage means is arranged to store more than one set of account details.

Preferably the storage means is arranged to store electronic cash and the communication means is arranged to facilitate the use of the electronic cash stored in the storage means if the user identification is verified.

In one embodiment the user identification means includes a keypad for entry of a personal identification number (PIN) and PIN verification means to authenticate the identity of the user. In another embodiment the user identification means includes a fingerprint reader for reading a fingerprint of the user and a fingerprint verifying means for verifying the identity of the user from the user's fingerprint. In yet another embodiment the user identification means includes a retina scanner for scanning a retina pattern and a retina pattern verifying means for verifying the identity of the user from the scanned retina pattern.

In one embodiment the communication means includes an infra red transfer means. In another embodiment the communication means includes a radio frequency transfer means. In yet another embodiment the communication means includes a magnetic induction transfer means. In yet a further embodiment the communication means includes a wire contact transfer means.

Preferably the storage means and communication means are partly in the form of a magnetic strip for storing account details and communication of the account details to the transaction station.

Preferably the communication means includes a telephone network interface.

Preferably the storage means stores transaction details and a processor means is provided to calculate the funds available.

Preferably the electronic credit card is incorporated into another device.

BRIEF DESCRIPTION OF THE DRAWINGS

In order to provide a better understanding, preferred embodiments will now be described in detail, by way of example only, with reference to the accompanying drawings, in which:

FIG. 1 is a schematic representation of an electronic credit card in accordance with the present invention;

FIG. 2 is a schematic representation of communication between an electronic credit card of FIG. 1 with a personal computer and thus and in turn via computer network with a host computer;

FIG. 3 is a schematic representation between electronic credit card of FIG. 1 and an ATM or EFTPOS terminal and a host computer;

FIG. 4 is an alternative embodiment of an electronic credit card in accordance with the present invention;

FIG. 5 is a further alternative embodiment of an electronic credit card in accordance with the present invention;

FIG. 6 is a further alternative embodiment of an electronic credit card in accordance with the present invention;

FIG. 7 is a further alternative embodiment of an electronic credit card in accordance with the present invention;

FIG. 8 is a further alternative embodiment of an electronic credit card in accordance with the present invention;

FIG. 9 is a rear view of an electronic credit card in accordance with the present invention having a magnetic strip communication device;

FIG. 10 is a further alternative embodiment of an electronic credit card in accordance with the present invention;

FIG. 11 is a further alternative embodiment of an electronic credit card in accordance with the present invention; and FIG. 12 is a further alternative embodiment of an electronic credit card in accordance with the present invention.

DETAILED DESCRIPTION OF THE INVENTION

Referring to FIG. 1, there is shown an electronic credit card including a user verification means; a means for generating a unique transaction identifier (not shown); a storage means for storing the user's account details (not shown); and a communication means. In this embodiment the user verification means includes a keypad for entry of a personal identification number (PIN) and the communication means includes a infra red communication device 5, a magnetic induction telecommunication device 6, radio frequency telecommunication device in the form of an antenna 7. The electronic credit card also includes a display 2, an enter/confirmation button and an audio transducer 4 for providing an audible sound.

The electronic card also includes a processor means for receiving input from the keypad 1 and the button 3. The processor means is also arranged to control output of the display 2 and output of the audio transducer 4. The processor means is further arranged to control communication via the communication means 5, 6, 7.

The keypad in combination with firmware control of the processor forms the user verification means. The processor under the control of firmware forms a means for generating the unique transaction identifier. The infra red communication device, magnetic communication device, or radio frequency communication device under the control of firmware control of the processor forms the communication means. The firmware may be stored in the storage means and may be reprogrammed.

The electronic credit card operates by a user entering a security authorization code, such as a PIN number into the keypad 1 whereby the user verification means verifies that the PIN number is correct and thus the identity of the user is verified. The means for generating unique transaction identifier then generates the transaction identifier. The security authorization code and unique transaction identifier are provided along with the user's account details, to the communication means which communicates these to a transaction station using the unique transaction identifier to facilitate an electronic funds transfer transaction. In an alternative, the electronic card is operational when a user is identified by a security authorization code in the form of a digital signature which may be activated when a fingerprint of the user or an eyeball/retina scan of the user is recognised, or the security authorization code may be generated from the fingerprint or eyeball/retina scan. Checking of the identity of the user can be conducted solely by the user verification means of the electronic card or in conjunction with a database in an external local or remote system.

The transaction station must be configured to only continue with the electronic funds transfer transaction with the receipt of the unique transaction identifier and security authorization code and account details. A transaction can only be authorised when the electronic credit card sends the security authorization code and unique transaction identifier to the transaction station which sends them to a host computer. The security authorization code may be sent using the unique transaction identifier for each transaction.

Referring to FIG. 2, communication between the electronic credit card is shown with a transceiver device which talks with a personal computer. The transceiver device and personal computer act, in this example as the transaction station. The transaction station may then communicate via wire or wireless communications to computer networks, such as the Internet to a host computer in order for conducting the electronic funds transfer transaction.

Referring to FIG. 3, the electronic credit card communicates by its communication means with an automatic teller machine (ATM) or an electronic funds transfer point of sale (EFTPOS) machine, which in turn communicates via standard methods to the host computer to perform electronic funds transfer, cash withdrawal or other transaction.

FIG. 4 shows a typical physical form of an electronic credit card with a keypad as the user verification means, and infra red receiver as part of the communication means.

FIG. 5 shows a version of the electronic credit cards with a keypad forming part of the user verification means and radio frequency antenna forming part of the communication means.

FIG. 6 shows a version of the electronic credit card with a keypad forming part of the user verification means and magnetic induction communication device 6 forming part of the communication means.

FIG. 7 shows a version of the electronic credit card with a keypad forming part of the user verification means and a wire contact communication device 8 forming part of the communication means.

FIG. 8 shows a version of the electronic credit card with a keypad acting as part of the user verification means and a magnetic strip 9 shown in FIG. 9 providing coded information as part of the communication means.

FIG. 10 shows a version of the electronic credit card with a keypad 1 forming part of the user verification means, a combination of infra red transmitter receiver 5, radio frequency antenna 7 and induction 6 forming part of the communication means.

Referring to FIG. 11, a version of the electronic credit card with a fingerprint scanner 10 forming part of the user verification means and an infra red transmitter receiver 5, radio frequency antenna 7 and indication means 6 forming part of the communication means.

Referring to FIG. 12, an embodiment of the electronic credit card including an eyeball retina scanner pad 11 which forms part of the user verification means and an infra red transmitter 5, radio frequency antenna 7 and a magnetic induction means 6 form part of the communication means.

Use of the electronic credit card will prevent merchants from using an authorized transaction as each transaction can only be generated by a unique transaction identifier provided by the electronic credit card. A merchant cannot generate a unique transaction identifier. The electronic credit card verifies the identity of the user before it is activated. The electronic credit card will be disabled if a predetermined number of attempts to gain access to its operation fail and this will prevent fraud in the event that an electronic credit card is stolen. An authorising distributor or other authorised body could re-initialise the electronic credit card through a controlled management system used to issue the electronic credit card.

The electronic credit card can be disabled at a transaction station through a system control function by the issuing company or organisation. This will enable immediate termination of electronic credit card if required. Electronic credit card may download information to a computer system via one of its telecommunication modes. This will ensure data integrity at a time when power source replacement or re-charging. Furthermore it will also facilitate transactional history download.

The electronic credit card may generate its transaction identifier, which may be a number, either in synchronisation with the transfer station link to a remote site system control function. The transaction station may be an Internet site with this capability.

The electronic credit card financial limit can be verified by the transaction station with a link to a remote site system. This will prevent the electronic credit card from generating further transactions once the financial limit is reached. The funds limiting function is optional and may be activated by either the financial institution issuing the electronic credit card or by the holder to cross-check and either alert him or her of his or her account balance. The electronic credit card may transact electronic cash which can be used as a currency exchange device. A traveller going abroad can choose to have a set amount for a specific currency of a particular country that he or she is visiting. The electronic credit card may be incorporated into another electronic device or piece of equipment, for example it may have been incorporated in a mobile phone.

An audio transducer is used to confirm a successful process of successful verification of the user and may also be used to provide communication over a telephone network.

A self-contained timer deactivates the user verification after a predetermined lapsed amount of time by deactivating the security authorization code. This feature eliminates a stolen electronic credit card from being used when the user identification has already been verified.

The electronic credit card keypads may be made from flexible board membrane, rubber and/or plastics material to provide durability and in a slim size. The keypad may be designed with round, square or other shaped buttons.

The electronic credit card can store more than one credit card/debit card accounts. These can be cards distributed from different financial institutions, organisations or companies. The electronic credit card can retain amounts of transactions conducted by the user, with information regarding his or her financial balance in relation to the account limit. This may be available for one or more credit card accounts.

Modifications and variations may be made to the present invention without departing from the basic inventive concepts. The nature of such modifications and variations are to be determined within the scope of the present invention as defined by the foregoing description and appended claims.

What is claimed is:

1. An electronic credit card comprising:
    a user verifier for receiving an input from a user in the form of a security authorization code or a precursor from which the security authorization code can be generated and verifying the identity of the user from the input;
    a code generator for generating a unique transaction identifier when the user's identity is verified;
    a storage for storing the user's account details for use in an electronic funds transfer transaction; and
    a communicator for communicating with a transaction station, wherein the communicator is configured to securely communicate the account details of the user and the security authorization code using the unique transaction identifier to the transaction station in order to facilitate an electronic fund transfer transaction.

2. An electronic credit card in accordance with claim 1, wherein the electronic credit card further comprises a timer for ending the verification of the user's identity after a period of time.

3. An electronic credit card in accordance with claim 1, wherein the electronic credit card further comprises a disabler for disabling use of the electronic credit card under certain conditions.

4. An electronic credit card in accordance with claim 3, wherein the disabler operates when activated remotely by an issuer of the electronic credit card or other authority on an ongoing basis in a system control function such that the electronic credit card cannot be ordinarily re-enabled.

5. An electronic credit card in accordance with claim 3, wherein the disabler operates when a predetermined number of attempts verify the identity of the user fail.

6. An electronic credit card in accordance with claim 1, wherein the unique transaction identifier is generated in synchronization with the transaction station.

7. An electronic credit card in accordance with claim 1, wherein the storage is arranged to store a financial limit wherein transactions over the financial limit are disallowed.

8. An electronic credit card in accordance with claim 7, wherein the communicator is configured to provide the financial limit to the transaction station.

9. An electronic credit card in accordance with claim 7, wherein the financial limit may be retrieved via the transaction station from a financial institution for storage in the storage.

10. An electronic credit card in accordance with claim 9, wherein the processor is configured to disallow generation of the authorization code or to disallow communication of the authorization code if the financial limit is exceeded.

11. An electronic credit card in accordance with claim 7, wherein the storage stores transaction details and a processor calculates funds available in the electronic fund transfer transaction from the financial limit.

12. An electronic credit card in accordance with claim 1, wherein the electronic credit card includes a processor for tracking of the use of the electronic credit card.

13. An electronic credit card in accordance with claim 1, wherein the storage is arranged to store more than one set of account details.

14. An electronic credit card in accordance with claim 1, wherein the storage is arranged to store electronic cash and the communicator is arranged to facilitate the use of the electronic cash when the user identification is verified.

15. An electronic credit card in accordance with claim 1, wherein the user verifier comprises a keypad for entry of the security authorization code in the form of a personal identification number (PIN) and PIN verification means to authenticate the identity of the user.

16. An electronic credit card in accordance with claim 1, wherein the user verifier comprises a fingerprint reader for reading a fingerprint, a fingerprint verifying means for verifying the identity of the user, and a generator of the security authorization code based on the read fingerprint.

17. An electronic credit card in accordance with claim 1, wherein the user verifier comprises a retina or eyeball scanner for scanning a retina or eyeball pattern, a retina or eyeball pattern verifying means for verifying the identity of the user, and a generator of the security authorization code based on the scanned retina or eyeball pattern.

18. An electronic credit card in accordance with claim 1, wherein the communicator comprises an infra red transfer means.

19. An electronic credit card in accordance with claim 1, wherein the communicator comprises a radio frequency transfer means.

20. An electronic credit card in accordance with claim 1, wherein the communicator comprises a magnetic induction transfer means.

21. An electronic credit card in accordance with claim 1, wherein the communicator comprises a wire contact transfer means.

22. An electronic credit card in accordance with claim 1, wherein the storage and communicator are partly in the form of a magnetic strip for storing the account details and communication of the account details to the transaction station.

23. An electronic credit card in accordance with claim 1, wherein the communicator comprises a telephone network interface.

24. An electronic credit card in accordance with claim 1, wherein the electronic credit card is incorporated into another device.

25. A method of conducting an electronic funds transfer transaction using an electronic card comprising:
   receiving an input from a user at the electronic card;
   verifying the identity of the user from the input;
   obtaining a security authorization code from the input;
   generating a unique transaction identifier when the user's identity is verified;
   securely communicating the security authorization code from the electronic card to a transaction station using the unique transaction identification along with user's account details stored in the electronic card.

* * * * *